(12) United States Patent
Sakata et al.

(10) Patent No.: US 7,560,749 B2
(45) Date of Patent: Jul. 14, 2009

(54) LIGHT EMITTING MATERIAL, LIGHT EMITTING DEVICE, AND ELECTRONIC DEVICE

(75) Inventors: Junichiro Sakata, Kanagawa (JP); Takahiro Kawakami, Kanagawa (JP); Yoshiaki Yamamoto, Kanagawa (JP); Miki Katayama, Kanagawa (JP); Kohei Yokoyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 142 days.

(21) Appl. No.: 11/625,114

(22) Filed: Jan. 19, 2007

(65) Prior Publication Data

US 2007/0176536 A1   Aug. 2, 2007

(30) Foreign Application Priority Data

Jan. 27, 2006   (JP)   ............................. 2006-019869

(51) Int. Cl.
    *H01J 1/62*   (2006.01)
(52) U.S. Cl. ............... 257/102; 257/103; 257/E33.019; 428/690; 252/301.6 R; 252/301.6 S; 252/301.6 P; 252/301.6 F; 252/301.4 P; 252/301.4 S; 252/301.4 H
(58) Field of Classification Search .............. 257/78, 257/E33.019; 252/301.4 H, 301.6 S; 428/696, 428/697, 702; 313/503; *B32B 18/00; C09K 11/62*
See application file for complete search history.

(56) References Cited

U.S. PATENT DOCUMENTS

| | | | |
|---|---|---|---|
| 3,786,315 A | | 1/1974 | Mead et al. |
| 5,006,277 A | * | 4/1991 | Yoneshima et al. ... 252/301.6 S |
| 5,102,579 A | | 4/1992 | Inaho et al. |
| 5,648,181 A | * | 7/1997 | Watanabe .................. 428/689 |

(Continued)

FOREIGN PATENT DOCUMENTS

JP   01-121395   5/1989

(Continued)

OTHER PUBLICATIONS

Noboru Miura et al.; "High-Luminance Blue-Emitting $BaAl_2S_4$:Eu Thin-Film Electroluminescent Devices"; *Jpn. J. Appl. Phys.*, vol. 38, Part 2, No. 11B; pp. L1291-L1292; Nov. 15, 1999.

(Continued)

*Primary Examiner*—Sue Purvis
*Assistant Examiner*—William Harriston
(74) *Attorney, Agent, or Firm*—Fish & Richardson P.C.

(57) ABSTRACT

An object is to provide a novel light emitting material. Another object is to provide a light emitting device and an electronic device with reduced power consumption. Still another object is to provide a light emitting device and an electronic device which can be manufactured at low cost. Provided is a light emitting element including a base material, a first impurity element, a second impurity element, and a third impurity element. The base material is one of ZnS, CdS, CaS, $Y_2S_3$, $Ga_2S_3$, SrS, BaS, ZnO, $Y_2O_3$, AlN, GaN, InN, ZnSe, ZnTe, and $SrGa_2S_4$; the first impurity element is any of Cu, Ag, Au, Pt, and Si; the second impurity element is any of F, Cl, Br, I, B, Al, Ga, In, and Tl; and the third impurity element is any of Li, Na, K, Rb, Cs, N, P, As, Sb, and Bi.

13 Claims, 8 Drawing Sheets

U.S. PATENT DOCUMENTS

| | | |
|---|---|---|
| 6,682,664 B1 | 1/2004 | Chen et al. |
| 6,770,221 B1 | 8/2004 | Chen et al. |
| 6,939,482 B2 | 9/2005 | Miura et al. |
| 6,982,124 B2 | 1/2006 | Abdul et al. |
| 7,176,616 B2 | 2/2007 | Yamashita |
| 2005/0073246 A1 | 4/2005 | Hoffman |
| 2005/0140272 A1 | 6/2005 | Shirata |
| 2005/0189518 A1 | 9/2005 | Arakawa |
| 2006/0192486 A1 | 8/2006 | Ogawa |
| 2007/0176535 A1 | 8/2007 | Sakata |

FOREIGN PATENT DOCUMENTS

| | | |
|---|---|---|
| JP | 01-318078 | 12/1989 |
| JP | 02-028282 | 1/1990 |
| JP | 04-039893 | 2/1992 |
| JP | 04-270779 | 9/1992 |
| JP | 07-305057 | 11/1995 |
| JP | 11-172245 | 6/1999 |
| JP | 2001-250681 | 9/2001 |
| JP | 2001-250691 | 9/2001 |
| JP | 2003-077677 | 3/2003 |
| JP | 2003-173878 | 6/2003 |
| JP | 2004-137354 | 5/2004 |
| JP | 2004-311422 | 11/2004 |
| JP | 2005-132947 | 5/2005 |
| JP | 2005-206821 | 8/2005 |
| JP | 2005-272798 | 10/2005 |
| JP | 2005-336275 | 12/2005 |
| JP | 2006-233134 | 9/2006 |

OTHER PUBLICATIONS

Haobo Bao et al.; "Enhancement Effect of Illumination on the Photoluminescence of Water-Soluble CdTe Nanocrystals: Toward Highly Fluorescent CdTe/Cds Core-Shell Structure"; *Chem. Mater., vol. 16, No. 20*, pp. 3853-3859; 2004.

Katsu Tanaka et al.; "Red Electroluminescence of Mn-doped $CuAlS_2$ Powder and Single Crystal"; *Jpn. J. Appl. Phys., vol. 37, Part 1, No. 6A*; pp. 3350-3356; Jun. 1998.

International Search Report (Application No. PCT/JP2007/050742), dated May 1, 2007, 5 pages.

Written Opinion (Application No. PCT/JP2007/050742), dated May 1, 2007, 6 pages.

\* cited by examiner

LIGHT EMITTING MATERIAL, LIGHT EMITTING DEVICE, AND ELECTRONIC DEVICE

TECHNICAL FIELD

The present invention relates to a light emitting material. The present invention also relates to a light emitting element utilizing electroluminescence. Further, the present invention relates to a light emitting device and an electronic device each having the light emitting element.

BACKGROUND ART

In recent years, thin and flat display devices have been needed as display devices in a television, a cellular phone, a digital camera, and the like, and as the display devices satisfying this need, display devices using self-light emitting elements have attracted attention. One of the self-light emitting elements is a light emitting element utilizing electroluminescence (EL), and this light emitting element includes a light emitting material interposed between a pair of electrodes and can provide light emission from the light emitting material by voltage application.

Such a self-light emitting element has advantages over a liquid crystal display element, such as high visibility of the pixels and no need of backlight and is considered suitable for a flat panel display element. Another major advantage of such a light emitting element is that it can be manufactured to be thin and lightweight. In addition, extremely high response speed is also a feature.

Further, such a self-light emitting element can be formed into a film shape; therefore, plane light emission can be easily obtained by forming a large-area element. Since this feature is hard to obtain from a point light source typified by an incandescent lamp or an LED, or a linear light source typified by a fluorescent lamp, the self-light emitting element has high utility as a plane light source which is applicable to a lighting system or the like.

Light emitting elements utilizing electroluminescence are classified according to whether a light emitting material is an organic compound or an inorganic compound. In general, the former is referred to as an organic EL element, the latter as an inorganic EL element.

Inorganic EL elements are classified according to their element structures into a dispersed inorganic EL element and a thin-film inorganic EL element. They are different from each other in that the former includes a light emitting layer in which particles of a light emitting material are dispersed in a binder and the latter includes a light emitting layer formed of a thin film of a phosphor material. However, their mechanisms are common, and light emission is obtained through collision excitation of a base material or a light emitting center by electrons accelerated by a high electric field. For such a reason, a high electric field is necessary for a general inorganic EL element to provide light emission, and it is necessary to apply a voltage of several hundred volts to a light emitting element. For example, a high-luminance blue light emitting inorganic EL element which is necessary for a full-color display has been developed in recent years; however, it requires a drive voltage of 100 V to 200 V (for example, Reference 1: Japanese Journal of Applied Physics, 1999, Vol. 38, pp. L1291-L1292). Therefore, the inorganic EL element consumes much power, and is difficult to be employed for a small-to-medium-sized display, for example, a display of a cellular phone or the like.

DISCLOSURE OF INVENTION

In view of the above problem, it is an object of the present invention to provide a novel light emitting material. It is another object to provide a light emitting element which can be driven at low voltage. It is still another object to provide a light emitting device and an electronic device with reduced power consumption. It is yet another object to provide a light emitting device and an electronic device which can be manufactured at low cost.

One aspect of the present invention is a light emitting element including a base material, a first impurity element, a second impurity element, and a third impurity element, in which the base material is any of zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), zinc oxide (ZnO), yttrium oxide ($Y_2O_3$), aluminum nitride (AlN), gallium nitride (GaN), indium nitride (InN), zinc selenide (ZnSe), zinc telluride (ZnTe), and strontium gallium sulfide ($SrGa_2S_4$); the first impurity element is any of copper (Cu), silver (Ag), gold (Au), platinum (Pt), and silicon (Si); the second impurity element is any of fluorine (F), chlorine (Cl), bromine (Br), iodine (I), boron (B), aluminum (Al), gallium (Ga), indium (In), and thallium (Tl); and the third impurity element is any of lithium (Li), sodium (Na), potassium (K), rubidium (Rb), cesium (Cs), nitrogen (N), phosphorus (P), arsenic (As), antimony (Sb), and bismuth (Bi).

In the above structure, the concentration of each of the first impurity element, the second impurity element, and the third impurity element is preferably 0.01 atomic % to 10 atomic % with respect to the base material. The concentration is more preferably 0.1 atomic % to 5 atomic % with respect to the base material.

Another aspect of the present invention is a light emitting material including a base material; any of copper fluoride ($CuF_2$), copper chloride (CuCl), copper iodide (CuI), copper bromide (CuBr), copper nitride ($Cu_3N$), copper phosphide ($Cu_3P$), silver fluoride (AgF), silver chloride (AgCl), silver iodide (AgI), silver bromide (AgBr), gold chloride ($AuCl_3$), gold bromide ($AuBr_3$), and platinum chloride ($PtCl_2$); and a third impurity element. The base material is any of zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), zinc oxide (ZnO), yttrium oxide ($Y_2O_3$), aluminum nitride (AlN), gallium nitride (GaN), indium nitride (InN), zinc selenide (ZnSe), zinc telluride (ZnTe), and strontium gallium sulfide ($SrGa_2S_4$); and the third impurity element is any of lithium (Li), sodium (Na), potassium (K), rubidium (Rb), cesium (Cs), nitrogen (N), phosphorus (P), arsenic (As), antimony (Sb), and bismuth (Bi).

Another aspect of the present invention is a light emitting material including a base material, a first impurity element, and any of alkali halide such as lithium fluoride (LiF), lithium chloride (LiCl), lithium iodide (LiI), copper bromide (LiBr), or sodium chloride (NaCl), boron nitride (BN), aluminum nitride (AlN), aluminum antimonide (AlSb), gallium phosphide (GaP), gallium arsenide (GaAs), indium phosphide (InP), indium arsenide (InAs), and indium antimonide (InSb). The base material is any of zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), zinc oxide (ZnO), yttrium oxide ($Y_2O_3$), aluminum nitride (AlN), gallium nitride (GaN), indium nitride (InN), zinc selenide (ZnSe), zinc telluride (ZnTe), and strontium gallium sulfide ($SrGa_2S_4$), and the first impurity element is any of copper (Cu), silver (Ag), gold (Au), platinum (Pt), and silicon (Si).

Another aspect of the present invention is a light emitting element including the above-described light emitting material between a pair of electrodes.

In the above structure, an insulating layer is preferably provided between a light emitting layer including the light emitting material and the electrode. The thickness of the insulating layer is preferably 1 nm to 500 nm. It is more preferably 1 nm to 100 nm.

One feature of the above structure is that the insulating layer includes any of yttrium oxide ($Y_2O_3$), aluminum oxide ($Al_2O_3$), tantalum oxide ($Ta_2O_5$), silicon oxide ($SiO_2$), and silicon nitride ($Si_3N_4$).

Another feature of the above structure is that the insulating layer includes one of barium titanate ($BaTiO_3$) and lead titanate ($PbTiO_3$).

Another feature of the above structure is that the light emitting layer including the light emitting material is the light emitting material formed into a thin film shape.

In addition, the present invention includes in its scope a light emitting device including the above-described light emitting element. The light emitting device in this specification includes in its category an image display device, a light emitting device, and a light source (including a lighting system). Further, the light emitting device includes all of the following modules: a module in which a connector such as an FPC (Flexible Printed Circuit), a TAB (Tape Automated Bonding) tape, or a TCP (Tape Carrier Package) is attached to a panel provided with light emitting elements; a module having a TAB tape or a TCP provided with a printed wiring board at the end thereof; and a module having an IC (Integrated Circuit) directly mounted on a light emitting device by a COG (Chip On Glass) method.

The present invention also includes in its scope an electronic device using the light emitting element of the present invention in a display portion. Therefore, one feature of an electronic device of the present invention is to include a display portion which includes the above-described light emitting element and a controller that controls light emission of the light emitting element.

The light emitting material of the present invention has high electrical conductivity. Therefore, a light emitting element using the light emitting material of the present invention can be driven at low voltage.

The light emitting device of the present invention includes the light emitting element which can be driven at low voltage; therefore, power consumption thereof can be reduced. Since a driver circuit with high withstand voltage is unnecessary, the light emitting device can be manufactured at low cost.

Further, the electronic device of the present invention includes the light emitting element which can be driven at low voltage; therefore, power consumption thereof can be reduced. Since a driver circuit with high withstand voltage is unnecessary, manufacturing cost of the electronic device can be reduced.

BEST MODE FOR CARRYING OUT THE INVENTION

Hereinafter, embodiments of the present invention are explained in detail with reference to the accompanying drawings. However, the present invention is not limited to the following description. As is easily known to a person skilled in the art, the mode and the detail of the present invention can be variously changed without departing from the spirit and the scope of the present invention. Thus, the present invention is not interpreted as being limited to the following description of the embodiments.

Embodiment 1

This embodiment explains a light emitting material according to the present invention. The light emitting material according to the present invention includes a base material and at least three impurity elements, and these impurity elements do not include an element that is included in the base material.

As a base material for the light emitting material, sulfide, oxide, or nitride can be used. As the sulfide, zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), or the like can be used, for example. As the oxide, zinc oxide (ZnO), yttrium oxide ($Y_2O_3$), or the like can be used, for example. As the nitride, aluminum nitride (AlN), gallium nitride (GaN), indium nitride (InN), or the like can be used, for example. Further, zinc selenide (ZnSe), zinc telluride (ZnTe), or the like or a ternary mixed crystal such as strontium gallium sulfide ($SrGa_2S_4$) may be used.

The light emitting material includes at least three kinds of impurity elements. As a first impurity element, copper (Cu), silver (Ag), gold (Au), platinum (Pt), silicon (Si), or the like can be used, for example. As a second impurity element, fluorine (F), chlorine (Cl), bromine (Br), iodine (I), boron (B), aluminum (Al), gallium (Ga), indium (In), thallium (Tl), or the like can be used, for example. As a third impurity element, lithium (Li), sodium (Na), potassium (K), rubidium (Rb), cesium (Cs), nitrogen (N), phosphorus (P), arsenic (As), antimony (Sb), bismuth (Bi), or the like can be used, for example. It is acceptable as long as the concentration of each of these impurity elements is in the range of 0.01 atomic % to 10 atomic %, preferably, in the range of 0.1 atomic % to 5 atomic % with respect to the base material.

In the light emitting material according to the present invention, the impurity elements are included in the base material through a solid phase reaction, that is, by a method in which the base material and the impurity elements are weighed, mixed in a mortar, and subjected to a reaction by heating in an electric furnace. Specifically, each of the base material, the first impurity element or a compound containing the first impurity element, the second impurity element or a compound containing the second impurity element, and the third impurity element or a compound containing the third impurity element is weighed, mixed in a mortar, and then heated and baked in an electric furnace. The baking temperature is preferably 700° C. to 1500° C. This is because a solid phase reaction does not proceed when the temperature is too low and the base material is decomposed when the temperature is too high. Note that the above mixture may be baked in powder form, but is preferably baked in pellet form.

As the impurity elements in the case of utilizing a solid phase reaction, a compound including the first impurity element and the second impurity element or the second impurity element and the third impurity element may be used. In this case, the impurity elements are easily diffused and the solid phase reaction easily proceeds, so that a uniform light emitting material can be obtained. Further, an unnecessary impurity element is not mixed, so that a high-purity light emitting element can be obtained. As the compound including the first impurity element and the second impurity element, copper fluoride ($CuF_2$), copper chloride (CuCl), copper iodide (CuI), copper bromide (CuBr), copper nitride ($Cu_3N$), copper phosphide ($Cu_3P$), silver fluoride (AgF), silver chloride (AgCl), silver iodide (AgI), silver bromide (AgBr), gold chloride ($AuCl_3$), gold bromide ($AuBr_3$), platinum chloride ($PtCl_2$), or the like can be used, for example. As the compound including the second impurity element and the third impurity element, alkali halide such as lithium fluoride (LiF), lithium chloride (LiCl), lithium iodide (LiI), copper bromide (LiBr), or sodium chloride (NaCl), boron nitride (BN), aluminum nitride (AlN), aluminum antimonide (AlSb), gallium phosphide (GaP), gallium arsenide (GaAs), indium phosphide (InP), indium arsenide (InAs), indium antimonide (InSb), or the like can be used, for example.

The light emitting material obtained in this manner can provide light emission by recombination of donor-acceptor pair and has high electrical conductivity.

Embodiment 2

Figure 1:
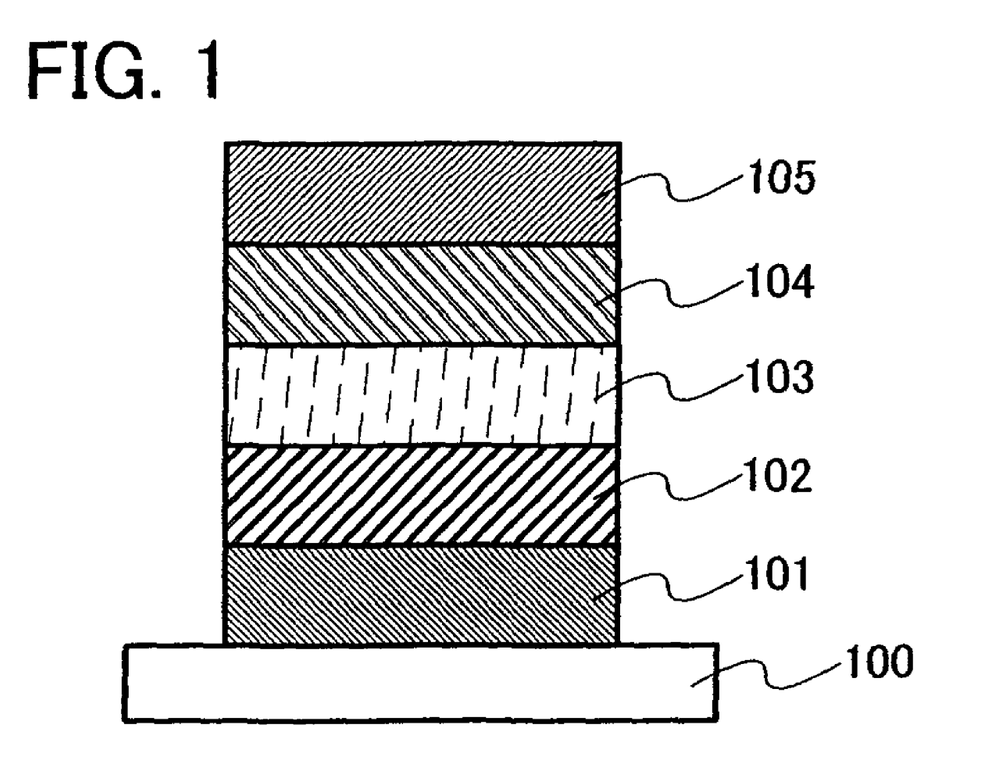
FIG. 1 is a diagram illustrating a light emitting element of the present invention.

This embodiment explains a thin-film light emitting element according to the present invention with reference to FIG. 1.

The light emitting element described in this embodiment has an element structure including, over a substrate 100, a first electrode 101 and a second electrode 105, a first insulating layer 102 and a second insulating layer 104 in contact with the electrodes, and a light emitting layer 103 between the first insulating layer 102 and the second insulating layer 104. The light emitting element described in this embodiment emits light by voltage application between the first electrode 101 and the second electrode 105 and can be operated by either DC drive or AC drive.

The substrate 100 is used as a support of the light emitting element. For the substrate 100, glass, plastic, or the like can be used, for example. Note that another material may be used as long as it functions as a support during a manufacturing process of the light emitting element.

The first electrode 101 and the second electrode 105 can be formed using a metal, an alloy, a conductive compound, a mixture thereof, or the like. Specifically, an example thereof is indium tin oxide (ITO), indium tin oxide containing silicon or silicon oxide, indium zinc oxide (IZO), indium oxide containing tungsten oxide and zinc oxide (IWZO), or the like. Films including these conductive metal oxides are generally formed by sputtering. For example, a film of indium zinc oxide (IZO) can be formed by sputtering using a target in which zinc oxide of 1 wt % to 20 wt % is added to indium oxide. A film of indium oxide containing tungsten oxide and zinc oxide (IWZO) can be formed by sputtering using a target containing tungsten oxide of 0.5 wt % to 5 wt % and zinc oxide of 0.1 wt % to 1 wt % with respect to indium oxide. Alternatively, aluminum (Al), silver (Ag), gold (Au), platinum (Pt), nickel (Ni), tungsten (W), chromium (Cr), molybdenum (Mo), iron (Fe), cobalt (Co), copper (Cu), palladium (Pd), or nitride of a metal material (for example, titanium nitride (TiN)) can be used. Note that in the case where the first electrode 101 or the second electrode 105 is formed to have a light transmitting property, a material with low visible light transmittance can also be used for a light transmitting electrode when formed with a thickness of approximately 1 nm to 50 nm, preferably, 5 nm to 20 nm. Note that the electrode can be formed by vacuum evaporation, CVD, or a sol-gel method other than sputtering.

Note that light emission is extracted to the outside through the first electrode 101 or the second electrode 105; therefore, at least one of the first electrode 101 and the second electrode 105 needs to be formed using a material having a light transmitting property.

The light emitting layer 103 is a layer including the light emitting material described in Embodiment 1, which can be formed by a vacuum evaporation method such as a resistance heating evaporation method or an electron beam (EB) evaporation method, a physical vapor deposition (PVD) method such as a sputtering method, a chemical vapor deposition (CVD) method such as a metal organic CVD method or a low-pressure hydride transport CVD method, an atomic layer epitaxy (ALE) method, or the like. Alternatively, an ink-jet method, a spin coating method, or the like can be used. Although the thickness is not particularly limited, it is preferably in the range of 10 nm to 1000 nm.

The first insulating layer 102 and the second insulating layer 104 are not particularly limited, but they preferably have high insulation resistance and dense film quality. Furthermore, they preferably have a high dielectric constant. For example, a film of silicon oxide ($SiO_2$), yttrium oxide ($Y_2O_3$), titanium oxide ($TiO_2$), aluminum oxide ($Al_2O_3$), hafnium oxide ($HfO_2$), tantalum oxide ($Ta_2O_5$), barium titanate ($BaTiO_3$), strontium titanate ($SrTiO_3$), lead titanate ($PbTiO_3$), silicon nitride ($Si_3N_4$), zirconium oxide ($ZrO_2$), or the like, a mixed film thereof, or a stacked film of two or more kinds can be used. These insulating films can be formed by sputtering, evaporation, CVD, or the like. Although the thickness is not particularly limited, it is preferably in the range of 10 nm to 1000 nm. Note that the light emitting element of this embodiment does not necessarily require hot electrons; therefore, it can be formed into a thin film and has an advantage of reduction in drive voltage. The light emitting element preferably has a thickness of 500 nm or less, more preferably, 100 nm or less.

Note that although not shown, a buffer layer may be provided between the light emitting layer and the insulating layer or between the light emitting layer and the electrode. This buffer layer facilitates carrier injection and functions to suppress mixture of both layers. Although a material of the buffer layer is not particularly limited, the base material of the light emitting layer such as ZnS, ZnSe, ZnTe, CdS, SrS, or BaS; CuS or $Cu_2S$; or alkali halide such as LiF, $CaF_2$, $BaF_2$, or $MgF_2$ can be used.

The light emitting element of the present invention can provide light emission from the light emitting layer without requiring hot electrons which are accelerated by a high electric field. In other words, there is no need to apply a high voltage to a light emitting element; therefore, a light emitting element which can be operated at low drive voltage can be obtained. Further, since light emission can be provided at low drive voltage, a light emitting element with reduced power consumption can also be obtained.

Note that this embodiment can be appropriately combined with another embodiment.

Embodiment 3

Figure 2:
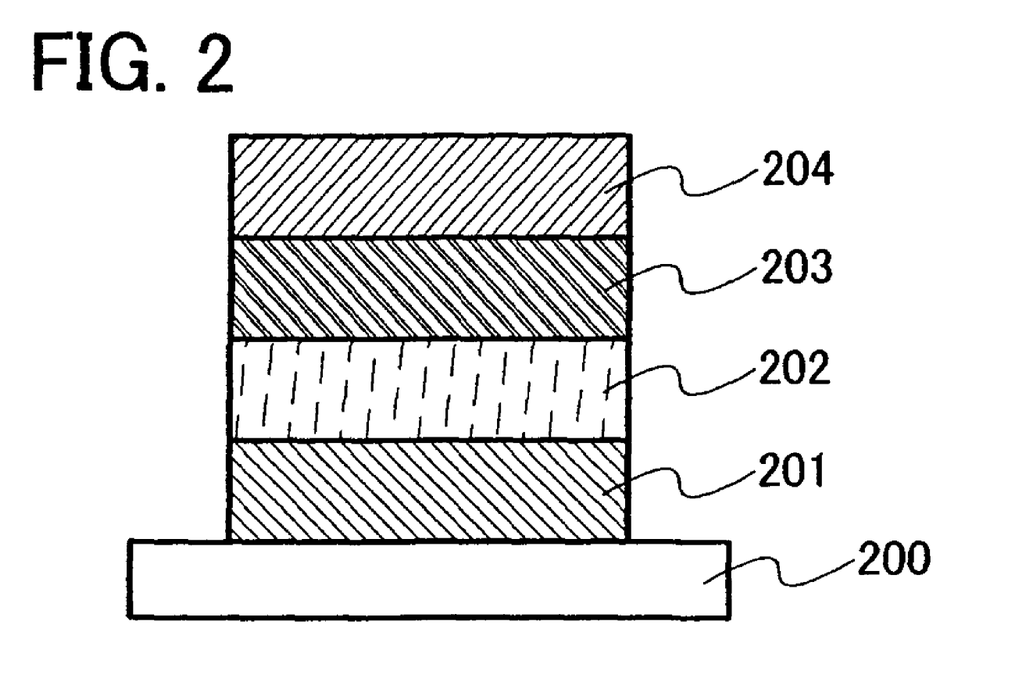
FIG. 2 is a diagram illustrating a light emitting element of the present invention.

This embodiment explains a thin-film light emitting element according to the present invention with reference to FIG. 2.

The light emitting element described in this embodiment has an element structure including, over a substrate 200, a first electrode 201 and a second electrode 204, an insulating layer 203 in contact with the second electrode 204, and a light emitting layer 202 between the first electrode 201 and the insulating layer 203. The light emitting element described in this embodiment emits light by voltage application between the first electrode 201 and the second electrode 204 and can be operated by either DC drive or AC drive.

The substrate 200 is used as a support of the light emitting element. For the substrate 200, glass, plastic, or the like can be used, for example. Note that another material may be used as long as it functions as a support during a manufacturing process of the light emitting element.

The first electrode 201 and the second electrode 204 can be formed using a metal, an alloy, a conductive compound, a mixture thereof, or the like. Specifically, an example thereof is indium tin oxide (ITO), indium tin oxide containing silicon or silicon oxide, indium zinc oxide (IZO), indium oxide containing tungsten oxide and zinc oxide (IWZO), or the like. Films including these conductive metal oxides are generally formed by sputtering. For example, a film of indium zinc oxide (IZO) can be formed by sputtering using a target in which zinc oxide of 1 wt % to 20 wt % is added to indium oxide. A film of indium oxide containing tungsten oxide and zinc oxide (IWZO) can be formed by sputtering using a target containing tungsten oxide of 0.5 wt % to 5 wt % and zinc oxide of 0.1 wt % to 1 wt % with respect to indium oxide. Alternatively, aluminum (Al), silver (Ag), gold (Au), platinum (Pt), nickel (Ni), tungsten (W), chromium (Cr), molybdenum (Mo), iron (Fe), cobalt (Co), copper (Cu), palladium (Pd), nitride of a metal material (for example, titanium nitride (TiN)), or the like can be used. Note that in the case where the first electrode 201 or the second electrode 204 is formed to have a light transmitting property, a film of a material with low visible light transmittance can also used as a light transmitting electrode when formed with a thickness of approximately 1 nm to 50 nm, preferably, 5 nm to 20 nm. Note that the electrode can also be formed by vacuum evaporation, CVD, or a sol-gel method other than sputtering.

Note that light emission is extracted to the outside through the first electrode 201 or the second electrode 204; therefore, at least one of the first electrode 201 and the second electrode 204 needs to be formed using a material having a light transmitting property.

The light emitting layer 202 is a layer including the light emitting material described in Embodiment 1, which can be formed by a vacuum evaporation method such as a resistance heating evaporation method or an electron beam (EB) evaporation method, a physical vapor deposition (PVD) method such as a sputtering method, a chemical vapor deposition (CVD) method such as a metal organic CVD method or a low-pressure hydride transport CVD method, an atomic layer epitaxy (ALE) method, or the like. Alternatively, an ink-jet method, a spin coating method, or the like can be used.

The insulating layer 203 is not particularly limited, but it preferably has high insulation resistance and dense film quality. Furthermore, it preferably has a high dielectric constant. For example, a film of silicon oxide ($SiO_2$), yttrium oxide ($Y_2O_3$), titanium oxide ($TiO_2$), aluminum oxide ($Al_2O_3$), hafnium oxide ($HfO_2$), tantalum oxide ($Ta_2O_5$), barium titanate ($BaTiO_3$), strontium titanate ($SrTiO_3$), lead titanate ($PbTiO_3$), silicon nitride ($Si_3N_4$), zirconium oxide ($ZrO_2$), or the like, a mixed film thereof, or a stacked film of two or more kinds can be used. These insulating films can be formed by sputtering, evaporation, CVD, or the like. Although the thickness is not particularly limited, it is preferably in the range of 10 nm to 1000 nm. Note that the light emitting element of this embodiment does not necessarily require hot electrons; therefore, it can be formed into a thin film shape and has an advantage of reduction in drive voltage. The light emitting element preferably has a thickness of 500 nm or less, more preferably, 100 nm or less.

Note that although not shown, a buffer layer may be provided between the light emitting layer and the insulating layer or between the light emitting layer and the electrode. This buffer layer facilitates carrier injection and functions to suppress mixture of both layers. Although a material of the buffer layer is not particularly limited, the base material of the light emitting layer such as ZnS, ZnSe, ZnTe, CdS, SrS, or BaS; CuS or $Cu_2S$; or alkali halide such as LiF, $CaF_2$, $BaF_2$, or $MgF_2$ can be used.

In FIG. 2, the insulating layer 203 is provided in contact with the second electrode 204; however, the order of the insulating layer and the light emitting layer may be reversed and the insulating layer 203 may be provided in contact with the first electrode 201.

The light emitting element of the present invention can provide light emission from the light emitting layer without requiring hot electrons which are accelerated by a high electric field. In other words, there is no need to apply a high voltage to a light emitting element; therefore, a light emitting element which can be operated at low drive voltage can be obtained. In addition, since light emission can be obtained at low drive voltage, a light emitting element with reduced power consumption can be obtained.

Note that this embodiment can be appropriately combined with another embodiment.

Embodiment 4

Figure 3:
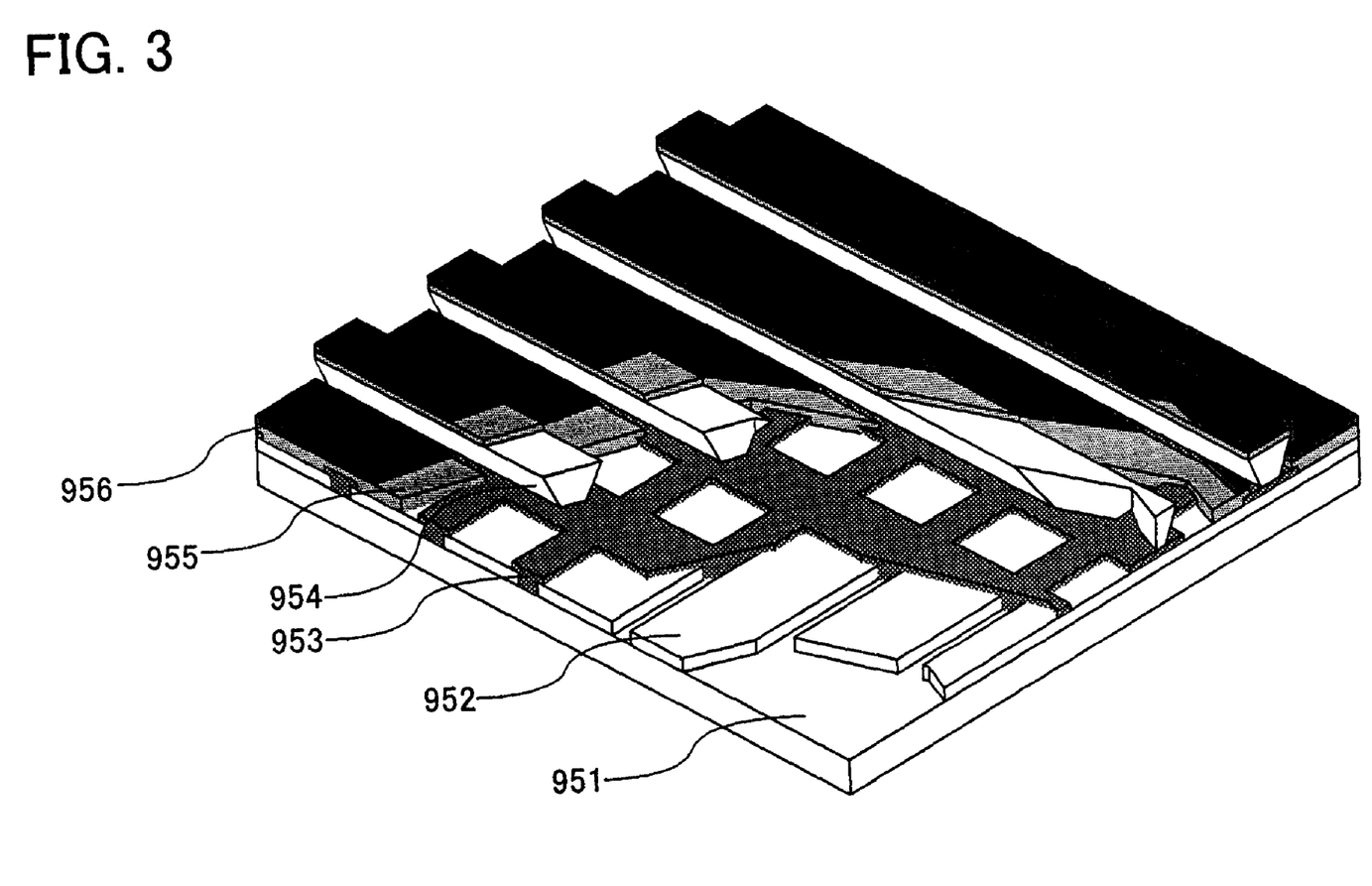
FIG. 3 is a diagram illustrating a light emitting device of the present invention.

This embodiment explains a light emitting device including the light emitting element of the present invention with reference to FIG. 3.

The light emitting device described in this embodiment is a passive-type light emitting device in which the light emitting element is driven without particularly providing a driver element such as a transistor. FIG. 3 shows a perspective view of a passive-type light emitting device which is manufactured by applying the present invention.

In FIG. 3, a layer 955 containing a light emitting material is provided between an electrode 952 and an electrode 956 over a substrate 951. The layer 955 containing a light emitting material includes the light emitting material described in Embodiment 1.

An end portion of the electrode 952 is covered with an insulating layer 953. A partition layer 954 is provided over the insulating layer 953. A side wall of the partition layer 954 slopes so that a distance between one side wall and the other side wall becomes narrow toward a substrate surface. In other words, a cross section of the partition layer 954 in the direction of a narrow side is trapezoidal, and a base (a side facing in the same direction as a plane direction of the insulating layer 953 and being in contact with the insulating layer 953)

is shorter than an upper side (a side facing in the same direction as the plane direction of the insulating layer 953 and not being in contact with the insulating layer 953). A defect of the light emitting element due to static electricity or the like can be prevented by providing the partition layer 954 in this manner. In addition, the passive-type light emitting device can also be driven with less power consumption when it includes the light emitting element of the present invention which operates at low drive voltage.

In addition, since the light emitting device of the present invention does not require a driver circuit with high withstand voltage, manufacturing cost of the light emitting device can be reduced. In addition, reductions in weight of the light emitting device and size of a driver circuit portion can be achieved.

Note that the light emitting device described in this embodiment can employ either the structure of the light emitting element described in Embodiment 2 or the structure of the light emitting element described in Embodiment 3. In other words, it is possible to manufacture either a light emitting device which is operated by DC drive or a light emitting device which is operated by AC drive.

Embodiment 5

This embodiment explains a light emitting device including the light emitting element of the present invention.

Figure 4A:
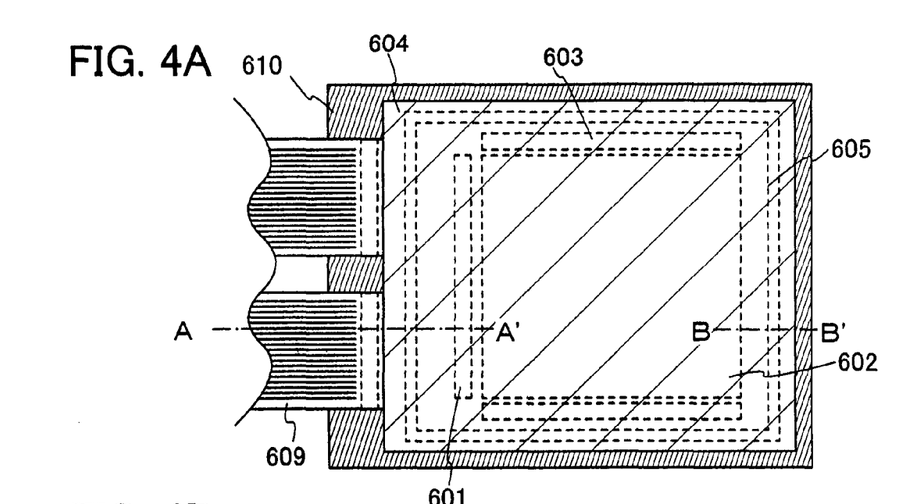
FIGS. 4A and 4B are diagrams illustrating a light emitting device of the present invention.
Figure 4B:
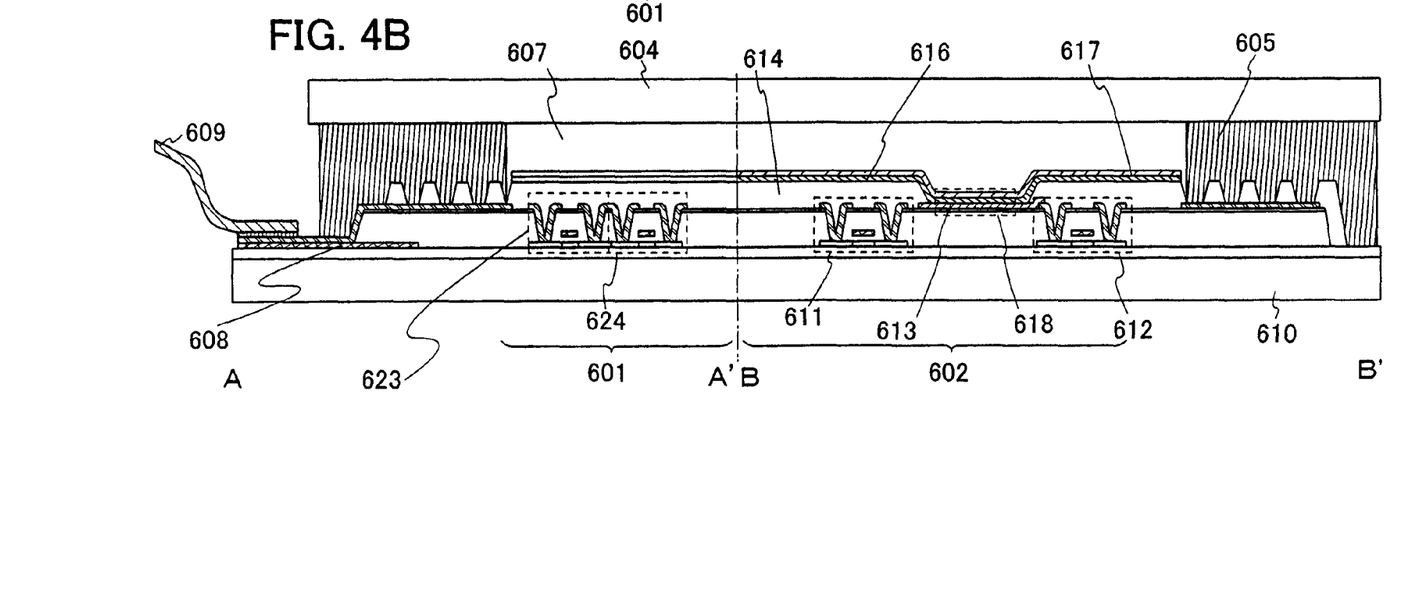

This embodiment explains an active-type light emitting device in which the driving of a light emitting element is controlled by a transistor. This embodiment explains a light emitting device including the light emitting element of the present invention in a pixel portion, with reference to FIGS. 4A and 4B. Note that FIG. 4A is a top view showing the light emitting device and FIG. 4B is a cross-sectional view of FIG. 4A taken along lines A-A' and B-B'. A reference numeral 601 denotes a driver circuit portion (a source side driver circuit); 602, a pixel portion; and 603, a driver circuit portion (a gate side driver circuit), each of which is indicated by dashed line. A reference numeral 604 denotes a sealing substrate; 605, a sealant; and 607, a space surrounded by the sealant 605.

Note that a lead wiring 608 is a wiring for transmitting signals to be inputted to the source side driver circuit 601 and the gate side driver circuit 603 and receives a video signal, a clock signal, a start signal, a reset signal, and the like from an FPC (Flexible Printed Circuit) 609 that serves as an external input terminal. Note that only the FPC is shown here; however, the FPC may be provided with a printed wiring board (PWB). The light emitting device in this specification includes not only a main body of the light emitting device but also the light emitting device with an FPC or a PWB attached.

Next, a cross-sectional structure is explained with reference to FIG. 4B. The driver circuit portions and the pixel portion are formed over an element substrate 610. Here, the source side driver circuit 601 that is the driver circuit portion and one pixel in the pixel portion 602 are shown.

Note that a CMOS circuit that is a combination of an n-channel TFT 623 and a p-channel TFT 624 is formed as the source side driver circuit 601. The driver circuit may be a CMOS circuit, a PMOS circuit, or an NMOS circuit. A driver integration type in which a driver circuit is formed over a substrate is described in this embodiment, but it is not necessarily required and a driver circuit can be formed not over a substrate but outside a substrate.

The pixel portion 602 includes a plurality of pixels, each of which includes a switching TFT 611, a current control TFT 612, and a first electrode 613 which is electrically connected to a drain of the current control TFT 612. Note that an insulator 614 is formed to cover an end portion of the first electrode 613. Here, a positive type photosensitive acrylic resin film is used.

The insulator 614 is formed to have a curved surface with curvature at an upper end portion or a lower end portion thereof in order to obtain favorable coverage. For example, in the case of using positive type photosensitive acrylic as a material of the insulator 614, the insulator 614 is preferably formed to have a curved surface with a curvature radius (0.2 μm to 3 μm) only at an upper end portion. Either a negative type which becomes insoluble in an etchant by light irradiation or a positive type which becomes soluble in an etchant by light irradiation can be used as the insulator 614.

A layer 616 containing a light emitting material and a second electrode 617 are formed over the first electrode 613. At least one of the first electrode 613 and the second electrode 617 has a light transmitting property, through which light emitted from the layer 616 containing a light emitting material can be taken out to the outside.

The layer 616 containing a light emitting material includes the light emitting material described in Embodiment 1.

Note that the first electrode 613, the layer 616 containing a light emitting material, and the second electrode 617 can be formed by various methods. Specifically, they can be formed by a vacuum evaporation method such as a resistance heating evaporation method or an electron beam (EB) evaporation method, a physical vapor deposition (PVD) method such as a sputtering method, a chemical vapor deposition (CVD) method such as a metal organic CVD method or a low-pressure hydride transport CVD method, an atomic layer epitaxy (ALE) method, or the like. Further, an ink-jet method, a spin coating method, or the like can be used. In addition, a different film formation method may be employed to form each electrode or layer.

By attaching the sealing substrate 604 to the element substrate 610 with the sealant 605, a light emitting element 618 is provided in the space 607 surrounded by the element substrate 610, the sealing substrate 604, and the sealant 605. Note that the space 607 is filled with a filler, but there is also a case where the space 607 is filled with the sealant 605 or filled with an inert gas (nitrogen, argon, or the like).

Note that an epoxy-based resin is preferably used as the sealant 605. The material preferably allows as little moisture and oxygen as possible to penetrate. As the sealing substrate 604, a plastic substrate formed of FRP (Fiberglass-Reinforced Plastics), PVF (polyvinyl fluoride), Mylar, polyester, acrylic, or the like can be used besides a glass substrate or a quartz substrate.

As described above, the light emitting device including the light emitting element of the present invention can be obtained.

The light emitting device of the present invention includes the light emitting element described in Embodiment 2 or 3. The light emitting element described in Embodiment 2 or 3 can be operated with low drive voltage. In addition, it can achieve high luminous efficiency. Thus, a light emitting device with reduced power consumption can be obtained.

In addition, since the light emitting device of the present invention does not require a driver circuit with high withstand voltage, manufacturing cost of the light emitting device can be reduced. In addition, reductions in weight of the light emitting device and size of a driver circuit portion can be achieved.

Embodiment 6

This embodiment explains an electronic device of the present invention which includes the light emitting device described in Embodiment 5. The electronic device of the present invention includes the light emitting element described in Embodiment 2 or 3. An electronic device with reduced power consumption can be provided because it includes a light emitting element with reduced drive voltage.

Examples of the electronic device manufactured using the light emitting device of the present invention are as follows: a camera such as a video camera or a digital camera, a goggle type display, a navigation system, a sound reproducing device (a car audio system, an audio component, or the like), a computer, a game machine, a portable information terminal (a mobile computer, a cellular phone, a mobile game machine, an electronic book, or the like), an image reproducing device having a recording medium (specifically, a device for reproducing a recording medium such as a digital versatile disc (DVD) and having a display for displaying the image), and the like. Specific examples of these electronic devices are shown in FIGS. 5A to 5D.

Figure 5A:
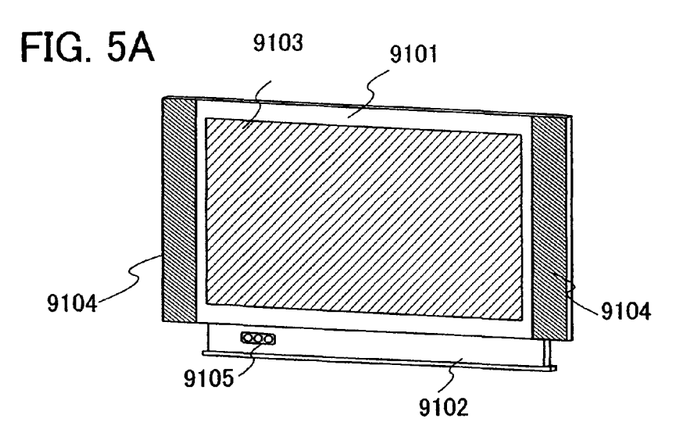
FIGS. 5A to 5D are diagrams illustrating electronic devices of the present invention.

FIG. 5A shows a television device according to the present invention, which includes a chassis 9101, a support base 9102, a display portion 9103, a speaker portion 9104, a video input terminal 9105, and the like. In this television device, the display portion 9103 includes light emitting elements similar to those described in Embodiments 2 and 3, which are arranged in matrix. The light emitting element has features of high luminous efficiency and low drive voltage. In addition, a short circuit due to impact from the outside, or the like can also be prevented. The display portion 9103 which includes the light emitting element also has a similar feature. Therefore, television device has less deterioration in image quality and consumes less power. With such features, a deterioration compensation circuit and a power supply circuit can be significantly reduced or downsized, thereby achieving reductions in size and weight of the chassis 9101 and the support base 9102. Since a reduction in power consumption, an improvement in image quality, and reductions in size and weight are achieved in the television device according to the present invention, a product which is suitable for living environment can be provided.

Figure 5B:
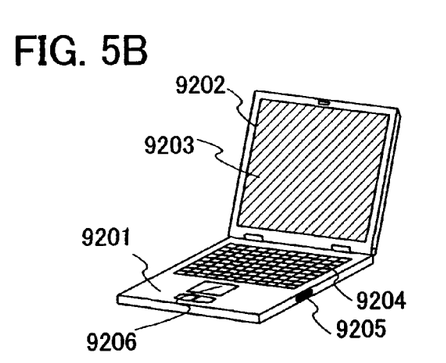

FIG. 5B shows a computer according to the present invention, which includes a main body 9201, a chassis 9202, a display portion 9203, a keyboard 9204, an external connection port 9205, a pointing mouse 9206, and the like. In this computer, the display portion 9203 includes light emitting elements similar to those described in Embodiments 2 and 3, which are arranged in matrix. The light emitting element has features of high luminous efficiency and low drive voltage. In addition, a short circuit due to impact from the outside, or the like can also be prevented. The display portion 9203 which includes the light emitting element has a similar feature. Therefore, this computer has less deterioration in image quality and consumes less power consumption. With such features, a deterioration compensation circuit and a power supply circuit can be significantly reduced or downsized in the computer, thereby achieving reductions in size and weight of the main body 9201 and the chassis 9202. Since a reduction in power consumption, an improvement in image quality, and reductions in size and weight thereof are achieved in the computer according to the present invention, a product which is suitable for environment can be provided. In addition, it becomes portable, and a computer including a display portion resistant to adding any impact from the outside when being carried can be provided.

Figure 5C:
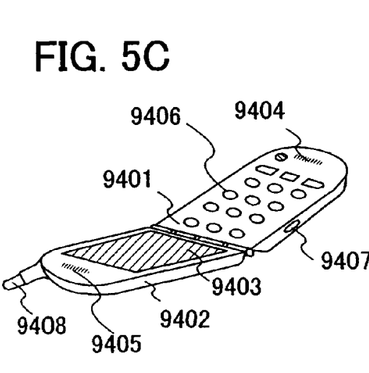

FIG. 5C shows a cellular phone according to the present invention, which includes a main body 9401, a chassis 9402, a display portion 9403, an audio input portion 9404, an audio output portion 9405, an operation key 9406, an external connection port 9407, an antenna 9408, and the like. In this cellular phone, the display portion 9403 includes light emitting elements similar to those described in Embodiments 2 and 3, which are arranged in matrix. The light emitting element has features of high luminous efficiency and low drive voltage. In addition, a short circuit due to impact from the outside, or the like can also be prevented. The display portion 9403 which includes the light emitting element also has a similar feature. Therefore, this cellular phone has less deterioration in image quality and consumes less power. With such features, a deterioration compensation circuit and a power supply circuit can be significantly reduced or downsized in the cellular phone, thereby achieving reductions in size and weight of the main body 9401 and the chassis 9402. Since a reduction in power consumption, an improvement in image quality, and reductions in size and weight thereof are achieved in the cellular phone according to the present invention, a product which is suitable for being carried can be provided. In addition, a product including a display portion resistant to adding any impact from the outside when being carried can also be provided.

Figure 5D:
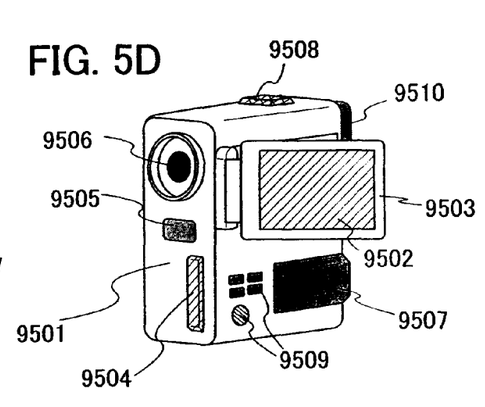

FIG. 5D shows a camera according to the present invention, which includes a main body 9501, a display portion 9502, a chassis 9503, an external connection port 9504, a remote control receiving portion 9505, an image receiving portion 9506, a battery 9507, an audio input portion 9508, an operation key 9509, an eye piece portion 9510, and the like. In this camera, the display portion 9502 includes light emitting elements similar to those described in Embodiments 2 and 3, which are arranged in matrix. The light emitting element has features of high luminous efficiency, low drive voltage, and capability of preventing a short circuit due to impact from the outside, or the like. The display portion 9502 which includes the light emitting element also has similar features. Therefore, this camera has less deterioration in image quality and consumes less power. With such features, a deterioration compensation circuit and a power supply circuit can be significantly reduced or downsized in the camera, thereby achieving reductions in size and weight of the main body 9501. Since a reduction in power consumption, an improvement in image quality, and reductions in size and weight thereof are achieved in the camera according to the present invention, a product which is suitable for being carried can be provided. In addition, a product including a display portion resistant to adding any impact from the outside when being carried can also be provided.

As described above, the applicable range of the display device of the present invention is so wide that the display device can be applied to electronic devices of various fields. By using the light emitting device of the present invention, an electronic device including a display portion which consumes less power and has high reliability can be provided.

In addition, the light emitting device of the present invention includes a light emitting element with high luminous efficiency and can also be used as a lighting system. One mode of using the light emitting element of the present invention as a lighting system is explained with reference to FIG. 6.

Figure 6:
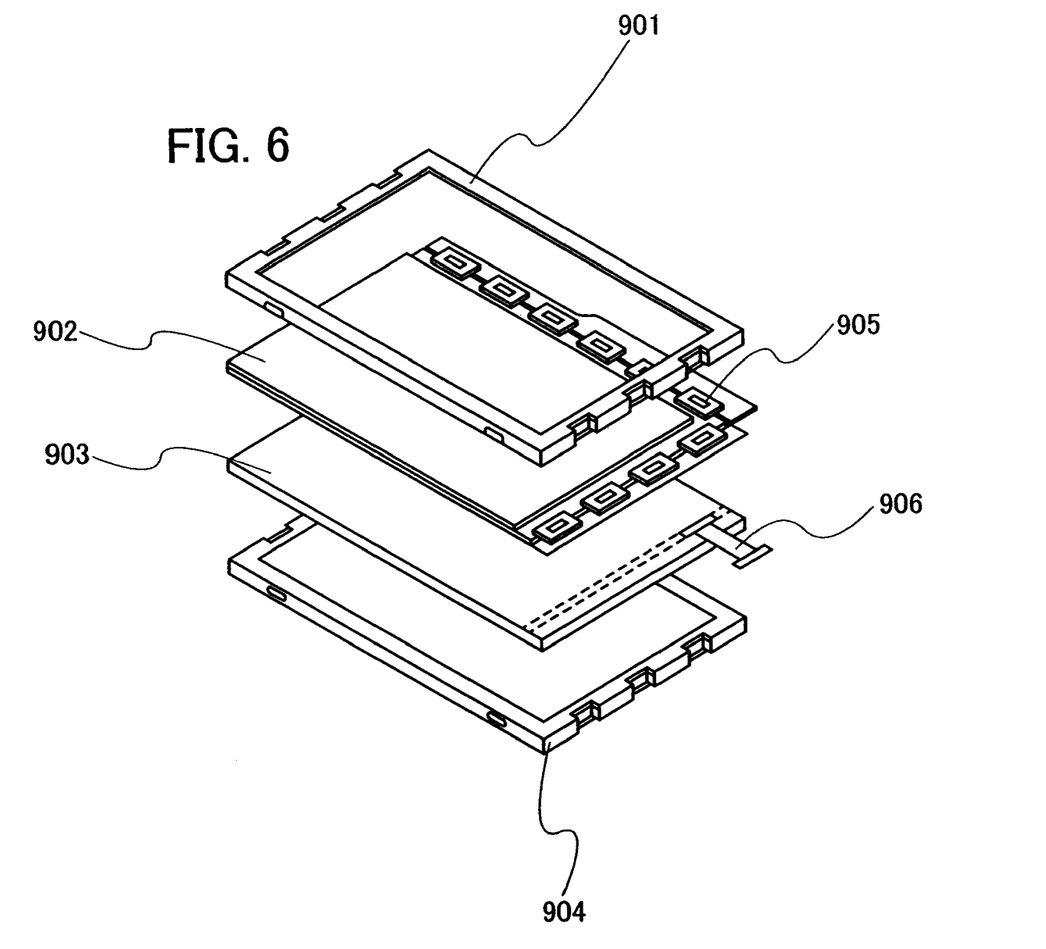
FIG. 6 is a diagram illustrating an electronic device of the present invention.

FIG. 6 shows an example of a liquid crystal display device using the light emitting device of the present invention as a backlight. The liquid crystal display device shown in FIG. 6 includes a chassis 901, a liquid crystal layer 902, a backlight 903, and a chassis 904. The liquid crystal layer 902 is connected to a driver IC 905. The light emitting device of the present invention is used as the backlight 903, to which a current is supplied through a terminal 906.

By using the light emitting device of the present invention as a backlight of a liquid crystal display device, a backlight which consumes less power can be obtained. Since the light emitting device of the present invention is a plane-emission lighting system and can be formed to have a large area, a larger-area backlight can be obtained and a larger-area liquid crystal display device can also be obtained. Further, the light emitting device of the present invention is thin and consumes less power; therefore, reductions in thickness and power consumption of the display device can also be achieved.

Hereinafter, the details of the present invention are explained using examples. Note that Table 1 shows manufacturers and purities of materials used for synthesis of a light emitting material. ZnS is manufactured by Kojundo Chemical Laboratory Co., Ltd.; CuCl, by Wako Pure Chemical Industries, Ltd.; AgCl, by Kojundo Chemical Laboratory Co., Ltd.; and LiF, by Wako Pure Chemical Industries, Ltd.

TABLE 1

| material | manufacturer | purity | state |
| --- | --- | --- | --- |
| ZnS | Kojundo Chemical Laboratory Co., Ltd. | 99.999% | powdery |
| CuCl | Wako Pure Chemical Industries, Ltd. | 95.0% | powdery |
| AgCl | Kojundo Chemical Laboratory Co., Ltd. | 99.9% | powdery |
| LiF | Wako Pure Chemical Industries, Ltd. | 99.9% | powdery |

Figure 7:
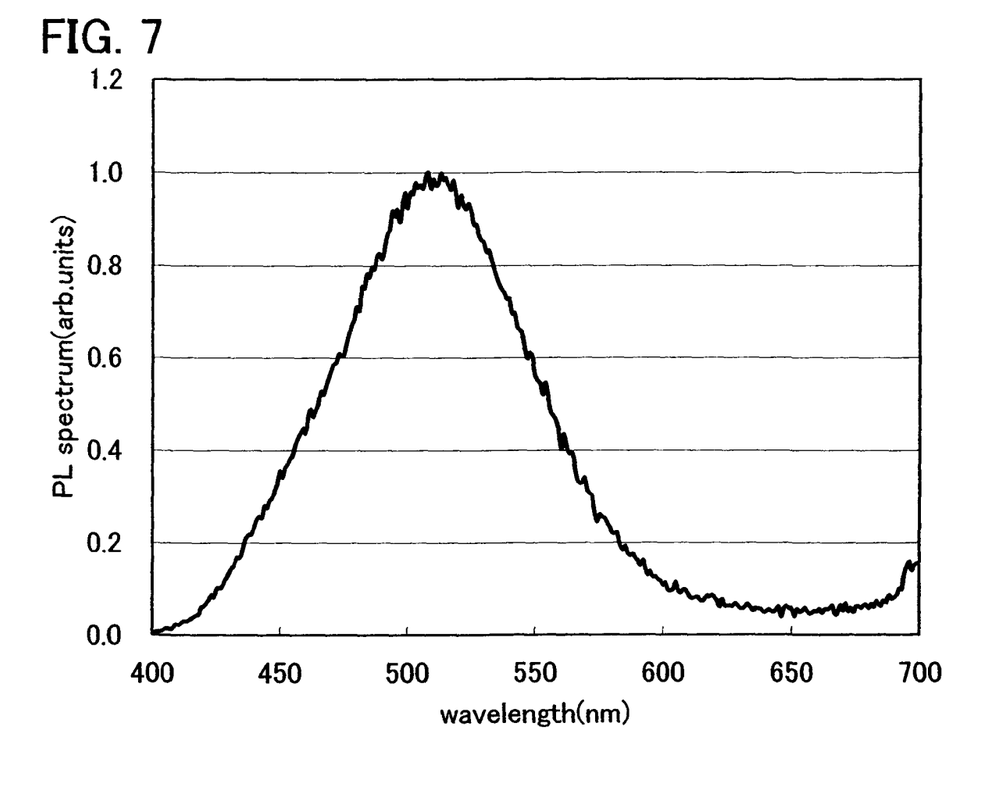
FIG. 7 is a diagram showing an emission spectrum of a light emitting material of Embodiment 1.

First, 10 g of ZnS, CuCl corresponding to 1 mol % with respect to ZnS, and LiF corresponding to 1 mol % with respect to ZnS were put in an agate mortar, and stirred and mixed for 10 minutes. Next, the mixture was put in an alumina crucible and baked at 1000° C. for 4 hours in an $N_2$ atmosphere. The resulting light emitting material was black. When the light emitting material was activated by light with a wavelength of 356 nm, blue-green light emission could be confirmed and its PL spectrum is shown in FIG. 7. FIG. 7 shows that it is light emission caused by recombination of donor-acceptor pair (Cl and Cu). In this example, the light emitting material includes Cu as the first impurity element; Cl, as the second impurity element; and Li, as the third impurity element. It is found that the Cu that is the first impurity element and Cl that is the second impurity element contribute to light emission and Li that is the third impurity element does not contribute to light emission.

EXAMPLE 2

Figure 8:
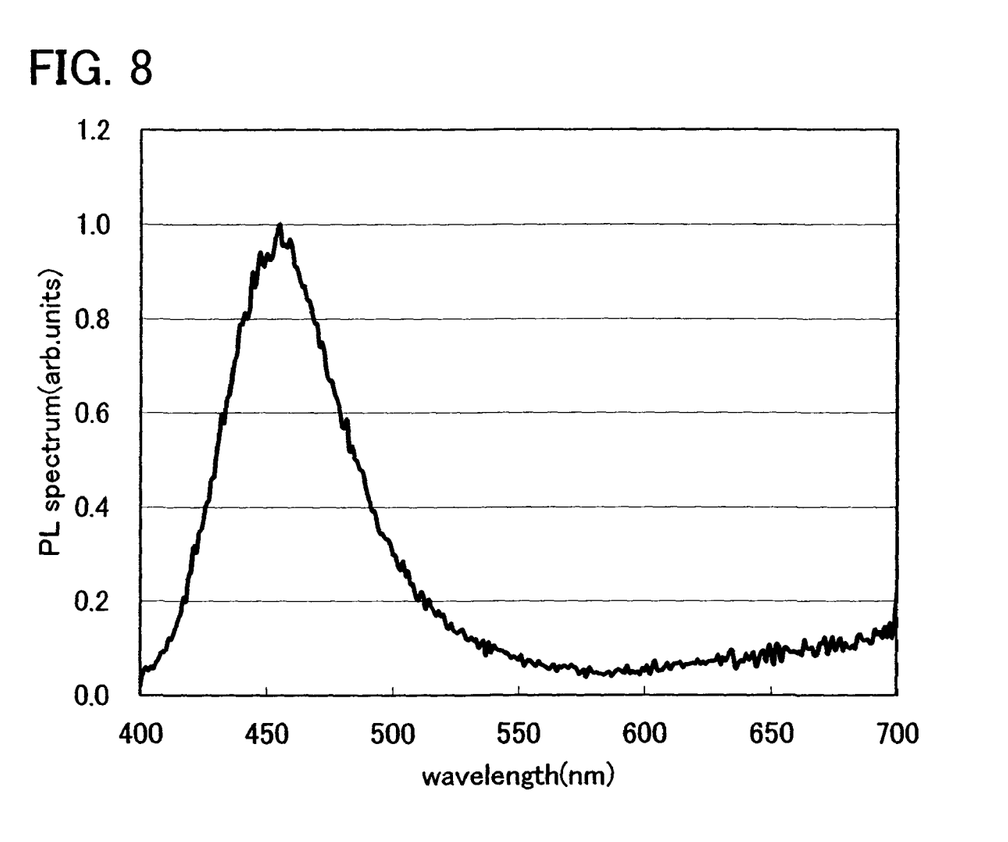
FIG. 8 is a diagram showing an emission spectrum of a light emitting material of Embodiment 2.

First, 10 g of ZnS, AgCl corresponding to 1 mol % with respect to ZnS, and LiF corresponding to 1 mol % with respect to ZnS were put in an agate mortar, and stirred and mixed for 10 minutes. Next, the mixture was put in an alumina crucible and baked at 1000° C. for 4 hours in an $N_2$ atmosphere. The resulting light emitting material was black. When the material was activated by light with a wavelength of 356 nm, blue light emission could be confirmed and its PL spectrum is shown in FIG. 8. FIG. 8 shows that it is light emission caused by recombination of donor-acceptor pair (Cl and Ag). The light emitting material of this example includes Ag as the first impurity element, Cl as the second impurity element, and Li as the third impurity element, and it is found that Ag that is the first impurity element and Cl that is the second impurity element contribute to light emission and Li that is the third impurity element does not contribute to light emission.

COMPARATIVE EXAMPLE 1

First, 10 g of ZnS and LiF corresponding to 1 mol % with respect to ZnS were put in an agate mortar, and stirred and mixed for 10 minutes. Next, the mixture was put in an alumina crucible and baked at 1000° C. for 4 hours in an $N_2$ atmosphere. The resulting material was white. Although the material was irradiated with light with wavelengths of 254 nm and 356 nm, light emission was not obtained. Therefore, it is found that light emission cannot be obtained only with F that is the second impurity element and Li that is the third impurity element.

This application is based on Japanese Patent Application serial no. 2006-019869 filed in Japan Patent Office on Jan. 27, 2006, the entire contents of which are hereby incorporated by reference.

The invention claimed is:

1. A light emitting material comprising:
   a base material;
   a material selected from the group consisting of copper fluoride, copper chloride, copper iodide, copper bromide, copper nitride, copper phosphide, silver fluoride, silver chloride, silver iodide, silver bromide, gold chloride, gold bromide, platinum chloride, and a combination thereof; and
   an impurity element,
   wherein the base material is a material selected from the group consisting of zinc sulfide, cadmium sulfide, calcium sulfide, yttrium sulfide, gallium sulfide, strontium sulfide, barium sulfide, zinc oxide, yttrium oxide, aluminum nitride, gallium nitride, indium nitride, zinc selenide, zinc telluride, strontium gallium sulfide, and a combination thereof, and
   wherein the impurity element is at least an element selected from the group consisting of lithium, sodium, potassium, rubidium, cesium, nitrogen, phosphorus, arsenic, antimony, and bismuth.

2. A light emitting material comprising:
   a base material;
   an impurity element; and
   a material selected from the group consisting of lithium fluoride, lithium chloride, lithium iodide, copper bromide, and sodium chloride, boron nitride, aluminum nitride, aluminum antimonide, gallium phosphide, gallium arsenide, indium phosphide, indium arsenide, indium antimonide, and a combination thereof,
   wherein the base material is a material selected from the group consisting of zinc sulfide, cadmium sulfide, calcium sulfide, yttrium sulfide, gallium sulfide, strontium sulfide, barium sulfide, zinc oxide, yttrium oxide, aluminum nitride, gallium nitride, indium nitride, zinc selenide, zinc telluride, strontium gallium sulfide, and a combination thereof, and
   wherein the impurity element is at least an element selected from the group consisting of copper, silver, gold, platinum, and silicon.

3. A light emitting device comprising:
   a pair of electrodes; a light emitting layer including a light emitting material between the pair of electrodes; and
   an insulating layer between the light emitting layer and one of the pair of electrodes, wherein the light emitting material comprises a base material, a material, and an impurity element, wherein the material is at least one selected from the group consisting of copper fluoride, copper chloride, copper iodide, copper bromide, copper nitride, copper phosphide, silver fluoride, silver chloride, silver iodide, silver bromide, gold chloride, gold bromide, platinum chloride, and a combination thereof, wherein the base material is a material selected from the group consisting of zinc sulfide, cadmium sulfide, calcium sulfide, yttrium sulfide, gallium sulfide, strontium sulfide, barium sulfide, zinc oxide, yttrium oxide, aluminum nitride, gallium nitride, indium nitride, zinc selenide, zinc telluride, strontium gallium sulfide, and a combination thereof, and wherein the impurity element at least an element selected from the group consisting of lithium, sodium, potassium, rubidium, cesium, nitrogen, phosphorus, arsenic, antimony, and bismuth.

4. The light emitting device according to claim 3, wherein a thickness of the insulating layer is 1 nm to 500 nm.

5. The light emitting device according to claim 3, wherein a thickness of the insulating layer is 1 nm to 100 nm.

6. The light emitting device according to claim 3, wherein the insulating layer includes at least one selected from the group consisting of yttrium oxide, aluminum oxide, tantalum oxide, silicon oxide, and silicon nitride.

7. The light emitting device according to claim 3, wherein the insulating layer includes at least one of barium titanate and lead titanate.

8. A light emitting device comprising:
a pair of electrodes;
a light emitting layer including a light emitting material between the pair of electrodes; and
an insulating layer between the light emitting layer and one of the pair of electrodes, wherein the light emitting material comprises a base material, a material, and an impurity element, wherein the material is a material selected from the group consisting of lithium fluoride, lithium chloride, lithium iodide, copper bromide, and sodium chloride, boron nitride, aluminum nitride, aluminum antimonide, gallium phosphide, gallium arsenide, indium phosphide, indium arsenide, indium antimonide, and a combination thereof, wherein the base material is a material selected from the group consisting of zinc sulfide, cadmium sulfide, calcium sulfide, yttrium sulfide, gallium sulfide, strontium sulfide, barium sulfide, zinc oxide, yttrium oxide, aluminum nitride, gallium nitride, indium nitride, zinc selenide, zinc telluride, strontium gallium sulfide, and a combination thereof, and wherein the impurity element is at least an element selected from the group consisting of copper, silver, gold, platinum, and silicon.

9. The light emitting device according to claim 8, wherein a thickness of the insulating layer is 1 nm to 500 nm.

10. The light emitting device according to claim 8, wherein a thickness of the insulating layer is 1 nm to 100 nm.

11. The light emitting device according to claim 8, wherein the insulating layer includes at least one selected from the group consisting of yttrium oxide, aluminum oxide, tantalum oxide, silicon oxide, and silicon nitride.

12. The light emitting device according to claim 8, wherein the insulating layer includes at least one of barium titanate and lead titanate.

13. An electronic device having the light emitting device according to any one of claims 3 to 12, wherein the light emitting device includes a display device.

* * * * *